United States Patent [19]
Ponting

[11] 3,754,938
[45] Aug. 28, 1973

[54] PRESERVATION OF APPLE SLICES WITH A SOLUTION CONSISTING OF ASCORBIC ACID, CALCIUM CHLORIDE AND SODIUM BICARBONATE

[75] Inventor: James D. Ponting, El Cerrito, Calif.

[73] Assignee: The United States of America as represented by the Secretary of Agriculture, Washington, D.C.

[22] Filed: May 26, 1971

[21] Appl. No.: 147,153

[52] U.S. Cl. ............... 99/154, 99/100, 99/103, 99/150, 99/156
[51] Int. Cl. ..................... A23b 7/00, A23b 7/10
[58] Field of Search ............... 99/100, 103, 154, 99/156, 150

[56] References Cited
UNITED STATES PATENTS

| | | | |
|---|---|---|---|
| 2,475,838 | 7/1949 | Johnson | 99/103 |
| 2,534,263 | 12/1950 | Hills | 99/103 |
| 2,894,843 | 7/1959 | Malecki | 99/183 |
| 2,744,016 | 5/1956 | Crab | 99/101 |

*Primary Examiner*—Norman Yudkoff
*Assistant Examiner*—Martin G. Mullen
*Attorney*—R. Hoffman, W. Bier and W. Takacs

[57] ABSTRACT

The quality of apple slices is preserved for an extended period of time by the synergistic effect of a treatment solution consisting of ascorbic acid, calcium chloride and sodium bicarbonate. Treatment with said solution eliminates the use of any sulfiting agent in a process for the preservation of apple slices.

1 Claim, No Drawings

PRESERVATION OF APPLE SLICES WITH A SOLUTION CONSISTING OF ASCORBIC ACID, CALCIUM CHLORIDE AND SODIUM BICARBONATE

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel procedures for preserving apples. Further objects of the invention will be obvious from the following description wherein parts and percentages are by weight unless otherwise specified.

For sale to the bakery trade, institutions, etc., it is conventional for food processors to put up apples in a form wherein they may conveniently be used in preparing pies, tarts, and similar products. The conventional procedure involves the following steps. Apples are washed, peeled, cored, and cut into slices. The slices are then sulphited, that is, they are dipped into an aqueous solution containing sodium bisulphite, or other soluble sulphite, or sulphurous acid. The sulphited slices are packed—for example, in plastic bags—, then cooled to refrigeration temperature (about 35°–45° F.) and held at such temperature during shipping and storage. The products are not intended to be preserved indefinitely; they are meant to be used within about 7 to 30 days after preparation. It may be noted that the sulphiting treatment is an essential element to preserve the color of the fruit; without such treatment the slices would rapidly turn brown and be unfit for use.

Although sulphited fresh apple slices are used in industry on a substantial scale, they suffer from the disadvantage that the sulphiting treatment gives the fruit an undesirable taste and odor.

The primary object of the invention is the provision of means for obviating the problem outlined above.

In accordance with the invention fresh apple slices are preserved by a procedure which eliminates the use of any sulphiting agent. Instead, a treatment and which, moreover, does not impair the flavor and odor of the fruit.

Basically, the process of the invention involves the following steps:

1. Using conventional techniques, apples are washed, peeled, cored, and sliced. 2. The apple slices are dipped into a special preservative solution, as hereinafter described. 3. The treated slices are drained, packaged in conventional manner, cooled to refrigeration temperature, and held at such temperature until ready for use.

The preservative solution used in accordance with the invention contains the following ingredients dissolved in water:

A. Ascorbic acid in a concentration of 0.5 to 1 percent, preferably 1 percent.

B. Calcum chloride in a concentration of 0.05 to 0.1 percent (as calcium), preferably 0.1 percent.

C. For best results the solution should contain enough sodium bicarbonate to maintain it at a pH of 7 to 9 during use. It has been observed that where sodium bicarbonate is not used, the solution becomes quite acid (due to leaching of malic acid from the slices), with the result that the preservative effect of the solution is lessened.

It is achknowledged that treatments are known wherein either ascorbic acid alone or calcium chloride alone are applied to apple slices. However, these agents have only slight effect by themselves so that such treatments cannot maintain quality for the required distribution time. I have found that where the agents are used in combination, a synergistic effect is attained in that the products retain their quality for extended periods of time, for example, as long as two months or more.

EXAMPLES

The invention is further demonstrated by the following illustrative examples.

In some of the experiments reported below, several of the treatments are not representative of the invention; they are included for purpose of comparison.

EXAMPLE 1

Newtown Pippin apples were peeled, cored, and sliced. The apple slices were divided into several lots, each lot being treated as follows:

The apple slices were dipped for 3 minutes in an aqueous solution containing certain proportions of ascorbic acid and/or calcium chloride. In each case, the solutions were adjusted to pH 7.0 by addition of sodium bicarbonate, as necessary. After the dipping treatment, the apple slices were drained, packed into plastic bags, and stored for 13 weeks in a refrigerator at 34° F. At the end of this time the slices were removed and examined.

Using a reflectance meter, measurements were made of the reflectance of the fresh (untreated) slices and the stored products. From these measurements there was calculated the per cent loss in reflectance of the stored products versus that of the fresh slices. The resulting data is an indication of the color of the products in that a lower figure denotes a product lighter in color, that is, closer to the natural color of the fresh fruit. The results are tabulated below:

| Lot | Contents of dipping solution | | Condition of product after storage | |
|---|---|---|---|---|
| | Ascorbic acid, % | Calcium chloride, %Ca. | Loss in reflectance, % | Color (visual) |
| 1 (Control) | 0 | 0 | 43.5 | Dark brown |
| 2 (Control) | 1.0 | 0 | 40.6 | Medium brown |
| 3 (Control) | 0 | 0.10 | 15.7 | Slightly brown |
| 4 (In accordance with invention) | 1.0 | 0.1 | 2.1 | Light, natural color |

EXAMPLE 2

The procedure of Example 1 was repeated, except that in this case no attempt was made to adjust the pH of the solutions.

The results are tabulated below:

| | Contents of dipping solution | | Condition of product after storage | |
|---|---|---|---|---|
| | Ascorbic acid, % | Calcium chloride, % Ca. | Loss in reflectance, % | Color (visual) |
| 1 (Control) | 0 | 0 | 39.7 | Dark brown |
| 2 (Control) | 1.0 | 0 | 8.3 | Slightly brown |
| 3 (Control) | 0 | 0.1 | 12.1 | " " |
| 4 (In accordance with invention) | 1.0 | 0.1 | 5.4 | Light colored |

Having thus described the invention, what is claimed is:

1. A process for preserving apples in a fresh state, which consists of
   a. dipping fresh apple slices in an aqueous solution which contains solely the following ingredients---ascorbic acid in a concentration of 1 percent, calcium chloride in a concentration of 0.1 percent, and sufficient sodium bicarbonate to maintain a pH of 7 to 9,
   b. draining the dipped slices, cooling them to a temperature of about 35°–45° F., and holding them at such temperature until they are to be used.

* * * * *